(12) United States Patent
Kirkpatrick et al.

(10) Patent No.: US 7,158,988 B1
(45) Date of Patent: Jan. 2, 2007

(54) REUSABLE ONLINE SURVEY ENGINE

(75) Inventors: Mark A. Kirkpatrick, Conyers, GA (US); Wendy Jennings, Roswell, GA (US); Dongbiao Zheng, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 554 days.

(21) Appl. No.: 10/045,436

(22) Filed: Nov. 7, 2001

(51) Int. Cl.
*G06F 17/30* (2006.01)

(52) U.S. Cl. .................. 707/102; 707/104.1; 717/115; 705/10

(58) Field of Classification Search .................. 707/1, 707/3, 10, 100–104.1, 7; 705/1, 7, 10, 26–28; 709/217–219; 715/505–508, 530–534; 719/313–317; 434/308, 322, 327, 335, 350, 362
See application file for complete search history.

(56) References Cited

U.S. PATENT DOCUMENTS

| | | | | |
|---|---|---|---|---|
| 6,477,504 B1 * | 11/2002 | Hamlin et al. | ................. | 705/10 |
| 6,609,128 B1 * | 8/2003 | Underwood | .................. | 707/10 |
| 6,622,175 B1 * | 9/2003 | Piller | .......................... | 719/313 |
| 6,754,676 B1 * | 6/2004 | Dietz et al. | ............... | 707/104.1 |
| 6,763,395 B1 * | 7/2004 | Austin | ......................... | 709/245 |
| 6,826,745 B1 * | 11/2004 | Coker et al. | ................. | 717/115 |
| 6,832,239 B1 * | 12/2004 | Kraft et al. | .................. | 709/203 |
| 2003/0069874 A1 * | 4/2003 | Hertzog et al. | | |

OTHER PUBLICATIONS

Eyal Hertzog and Arnon Dinur, "Method and System to Automate the Updating of Personal Information within a Personal Information Management Application and to Synchronize Such Updated Personal Information Management Applications", Apr. 10, 2003.*

* cited by examiner

*Primary Examiner*—Debbie M. Le
(74) *Attorney, Agent, or Firm*—Merchant & Gould (57) ABSTRACT

A computer system, method, and computer-readable medium for conducting an online survey including one or more questions are provided. A survey database contains the survey questions and data identifying the type of input field that should be provided for responding to each question. When a request is received for a network resource referencing the online survey, the contents of the survey database are utilized to generate the online survey. The survey questions are maintained in the survey database separately from the application code for displaying the survey questions. Only the questions in the survey database need to be modified to provide a new survey. The application code for generating the survey is generic to all surveys and does not need to be modified.

12 Claims, 8 Drawing Sheets

| APPLICATION NAME | FORM NAME | VERSION | QUESTION | SEQUENCE | RESPONSE TYPE | RESPONSE PARAMETERS | ACTIVE? |
|---|---|---|---|---|---|---|---|
| | | 44A | 44B | 44C | 44D | 44E | 44F | 44G | 44N |
| MKTSURVEY | WIDGET | 1.0 | HOW MANY WIDGETS DO YOU OWN? | 1 | TEXT FIELD | 8 | YES |
| MKTSURVEY | WIDGET | 1.0 | WHEN DID YOU BUY YOUR LAST WIDGET? | 10 | TEXT FIELD | 10 | YES |
| MKTSURVEY | WIDGET | 1.0 | WHAT DO YOU LIKE BEST ABOUT OUR WIDGET? | 15 | TEXT AREA | 3,80 | YES |
| MKTSURVEY | WIDGET | 1.0 | WOULD YOU BUY ANOTHER WIDGET? | 5 | RADIO BUTTON | YES | YES |
| MKTSURVEY | WIDGET | 1.0 | WOULD YOU BUY ANOTHER WIDGET? | 5 | RADIO BUTTON | NO | YES |

| APPLICATION NAME | FORM NAME | VERSION | QUESTION | SEQUENCE | RESPONSE TYPE | RESPONSE PARAMETERS | ACTIVE? |
|---|---|---|---|---|---|---|---|
| MKTSURVEY | WIDGET | 1.0 | HOW MANY WIDGETS DO YOU OWN? | 1 | TEXT FIELD | 8 | YES |
| MKTSURVEY | WIDGET | 1.0 | WHEN DID YOU BUY YOUR LAST WIDGET? | 10 | TEXT FIELD | 10 | YES |
| MKTSURVEY | WIDGET | 1.0 | WHAT DO YOU LIKE BEST ABOUT OUR WIDGET? | 15 | TEXT AREA | 3,80 | YES |
| MKTSURVEY | WIDGET | 1.0 | WOULD YOU BUY ANOTHER WIDGET? | 5 | RADIO BUTTON | YES | YES |
| MKTSURVEY | WIDGET | 1.0 | WOULD YOU BUY ANOTHER WIDGET? | 5 | RADIO BUTTON | NO | YES |
| ... | ... | ... | ... | ... | ... | ... | ... |

REUSABLE ONLINE SURVEY ENGINE

FIELD OF THE INVENTION

The present invention relates to the field of online surveys. More particularly, but not by way of limitation, the present invention relates to the field of reusable software components for conducting surveys over a distributed computing network.

BACKGROUND OF THE INVENTION

In order to effectively market products and services to consumers both on and off the World Wide Web (the "Web" or "WWw"), it is necessary to collect accurate and relevant information regarding consumers and their purchasing habits. One way that Web sites have traditionally collected information is through the use of Web survey applications. Web survey applications conduct online surveys by providing a user with an input form that includes a number of questions along with input fields in which to provide answers to the questions. The user may then answer the survey by typing an answer for each question into the input fields. When the user has completed the survey, the user may transmit the provided answers back to the Web survey application. The survey answers may then be utilized, along with other user's answers to the survey, to better market the concerned product or service.

While Web survey applications are able to gather a great deal of information from a user, they are not without their drawbacks. The main drawback associated with Web survey applications stems from the fact that the lifetime of the Web survey application and the survey questions themselves are frequently different. For instance, a marketing group may provide a Web site that includes a survey for a particular type of product. The survey may include questions on customer satisfaction with the particular product and may be utilized for 90 days. After the survey is completed, the marketing group may wish to change the survey questions to focus on another type of product for a different time period. Changing the survey questions, however, can be very time consuming and expensive.

With prior art Web survey applications it is very difficult to change the application to provide a new set of survey questions. In particular, changing survey questions typically requires writing new application code to support the new questions, testing the new application code, and then deploying the new application code. This process be time consuming and expensive. What is needed, therefore, in light of these problems, is a Web survey engine that is reusable and that does not require program code to be modified in order to implement a new Web survey.

SUMMARY OF THE INVENTION

The present invention solves the above-described problems by providing a method, computer system, and computer-readable medium for conducting an online survey that advantageously does not require the modification of program code in order to implement a new survey.

Generally described, the present invention comprises a computer system for conducting an online survey including one or more questions. A survey database maintains the survey questions and data identifying the type of input field that should be provided for responding to each question. When a request is received for a network resource, such as a Web page, referencing the online survey, the contents of the survey database are utilized to generate displayable content for conducting the online survey. The survey questions are maintained in the survey database separately from the application code for displaying the survey questions. Therefore, only the questions in the survey database need to be modified to provide a new survey. The application code for generating the survey is generic to all surveys and does not need to be modified.

More specifically described, the present invention provides a computer system for generating an online survey. The computer system comprises a survey database that contains questions to be utilized in the survey and data identifying the type of input field corresponding to each question. The survey database also includes data that describes how each input field should be displayed. The survey database may also include data identifying the ordering sequence of the questions and data indicating whether particular questions should be included or excluded from a given survey. The survey database may also include data identifying a corresponding application, form name, and version number.

The computer system provided herein also comprises a network resource for generating the content necessary to conduct the survey and a software component for receiving and responding to requests for the network resource. When a request for the network resource is received, the software component compiles an executable class file capable of generating the content necessary to display the questions and input fields in a Web browser. The survey database, including the questions, input field types, and sequence information, is utilized to generate the class file. The software component then executes the class file and returns the resulting content as a response to the request for the network resource. In this manner, the online survey questions may be displayed in a Web browser with corresponding input fields. When the input fields have been populated with response data, the response data may be submitted to the software component for storage in a response table.

According to one actual embodiment of the present invention, the software component may determine whether a previously compiled version of the class file should be utilized to respond to the request for the network resource. If the request for the network resource is a first request for the network resource, a previously compiled version of the class file will not be utilized. Additionally, if the software component was reset since the previous access of the network resource was accessed, the previously compiled class file will not be utilized. Otherwise, the previously compiled class file will be utilized, thereby providing a faster response to the request for the network resource.

The present invention also provides an apparatus and computer-readable medium for providing a reusable online survey engine. Additional details regarding the present invention will be provided in the detailed description that follows.

DETAILED DESCRIPTION OF THE PREFERRED EMBODIMENT

The present invention is directed to a method, computer system, and computer-readable medium for providing a reusable online survey engine. Aspects of the present invention may be embodied in an executable software component for providing the functionality described herein. Additionally, aspects of the present invention may be embodied in software components utilized in conjunction with a Web server application program, such as the IPLANET WEB SERVER, provided by IPLANET E-COMMERCE SOLUTIONS—A SUN|NETSCAPE ALLIANCE, of Palo Alto, Calif.

Referring now to the figures, in which like numerals represent like elements, an actual embodiment of the present invention will be described. Although aspects of the invention will be described in the general context of an application program that executes on an operating system in conjunction with a server computer, those skilled in the art will recognize that the invention also may be implemented in combination with other program modules. Generally, program modules include routines, programs, components, data structures, and the like, that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. Although the invention is also described as being practiced in distributed computing environment, where tasks are performed by remote processing devices that are linked through a communications network, other possible implementations should be apparent to those skilled in the art.

Figure 1:
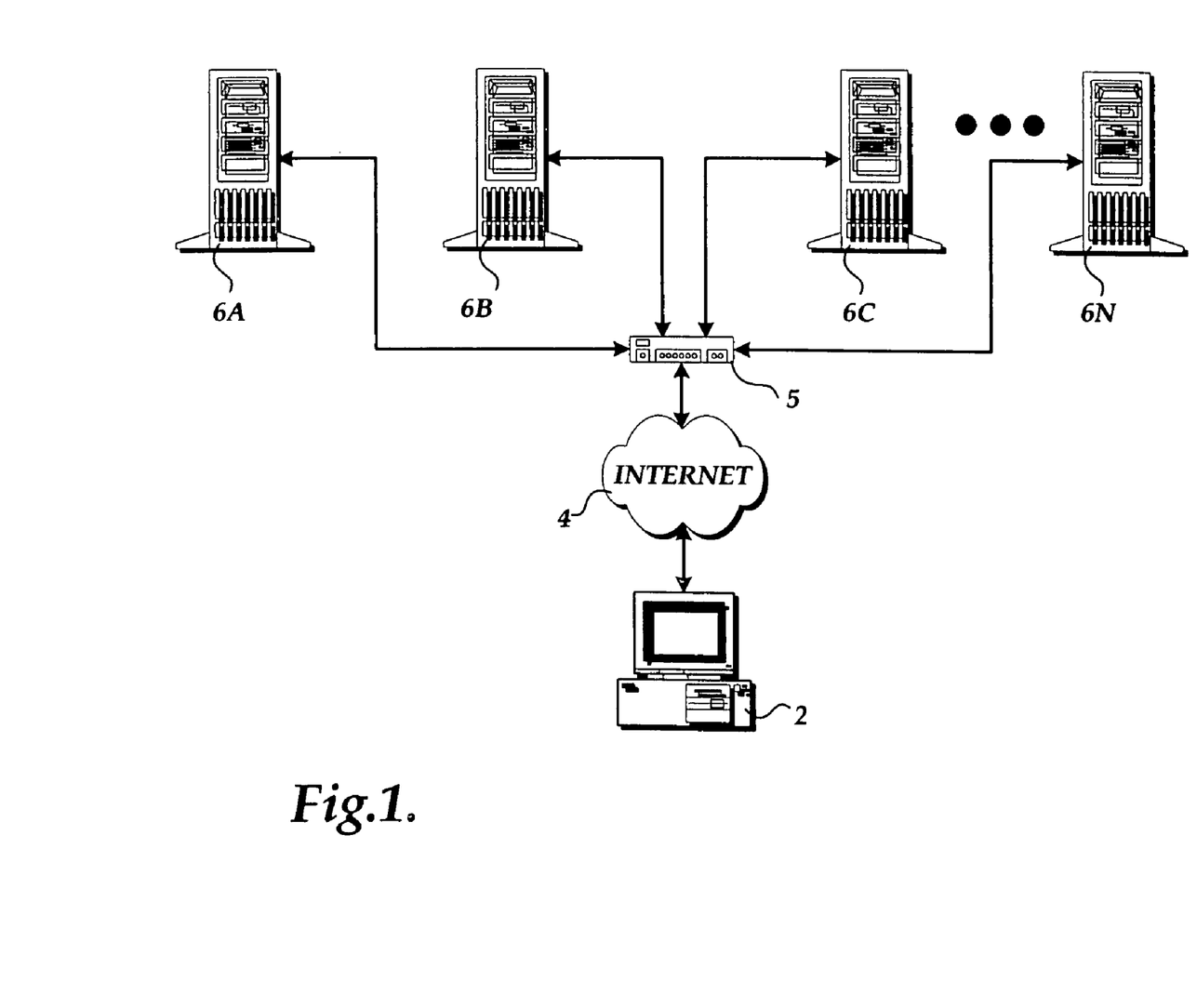
FIG. 1 is a network architecture diagram showing an illustrative operating environment for an actual embodiment of the present invention.

Referring now to FIG. 1, an illustrative operating environment for an embodiment of the present invention will be described. Aspects of the present invention are implemented as an executable software component executing on a server computer, such as Web server computers 6A–6N, accessible via a distributed computing network, such as the Internet 4. As is well known to those skilled in the art, the Internet 4 comprises a collection of networks and routers that use the Transmission Control Protocol/Internet Protocol ("TCP/IP") to communicate with one another. The Internet typically includes a plurality of local area networks ("LANs") and wide area networks ("WANs") that are interconnected by routers. Routers are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers, such as client computer 2, and other related electronic devices can be remotely connected to either the LANs or the WANs via a permanent network connection or via a modem and temporary telephone link. It will be appreciated that the Internet 4 comprises a vast number of such interconnected networks, computers, and routers.

A client computer 2 capable of executing a Web browser application program (not shown), such as Microsoft® Internet Explorer, may be utilized to transmit a request for a Web page or other type of network resource to one of the Web server computers 6A–6N. As is well known to those skilled in the art, the Web is a vast collection of interconnected network resources, including "hypertext" documents written in Hypertext Markup Language ("HTML"), or other markup languages, that are available from "Web sites" accessible through the Internet 4. A Web site is provided by a Web server computer, like Web server computers 6A–6N, connected to the Internet 4, that has mass storage facilities for storing such network resources, and that executes administrative software for handling requests for the network resources.

Large-scale Web sites are typically implemented utilizing a two-tier computer systems architecture as shown in FIG. 1. The first tier typically comprises one or more "front-end" Web server computers, like Web server computers 6A–6N, that receive and process live requests for network resources from client computers 2 connected to the Internet 4. As is well known to these skilled in the art, the first tier Web servers are frequently connected to the Internet 4 through a load balancing device 5, such as the Local Director™ from Cisco Systems@. The load balancing device 5 intercepts requests intended for one of the Web server computers 6A–6N, and forwards each request to a Web server computer that has computing resources available to respond to the request. In addition to the Web server computers 6A–6N, a large-scale Web site may also include a "back-end" server computer (not shown) that stores network resources that may be served to client computer 2 by one of the Web server computers 6A–6N. Additional details regarding the operation of the Web server computers 6A–6N will be provided below with respect to FIGS. 2–8.

Figure 2:
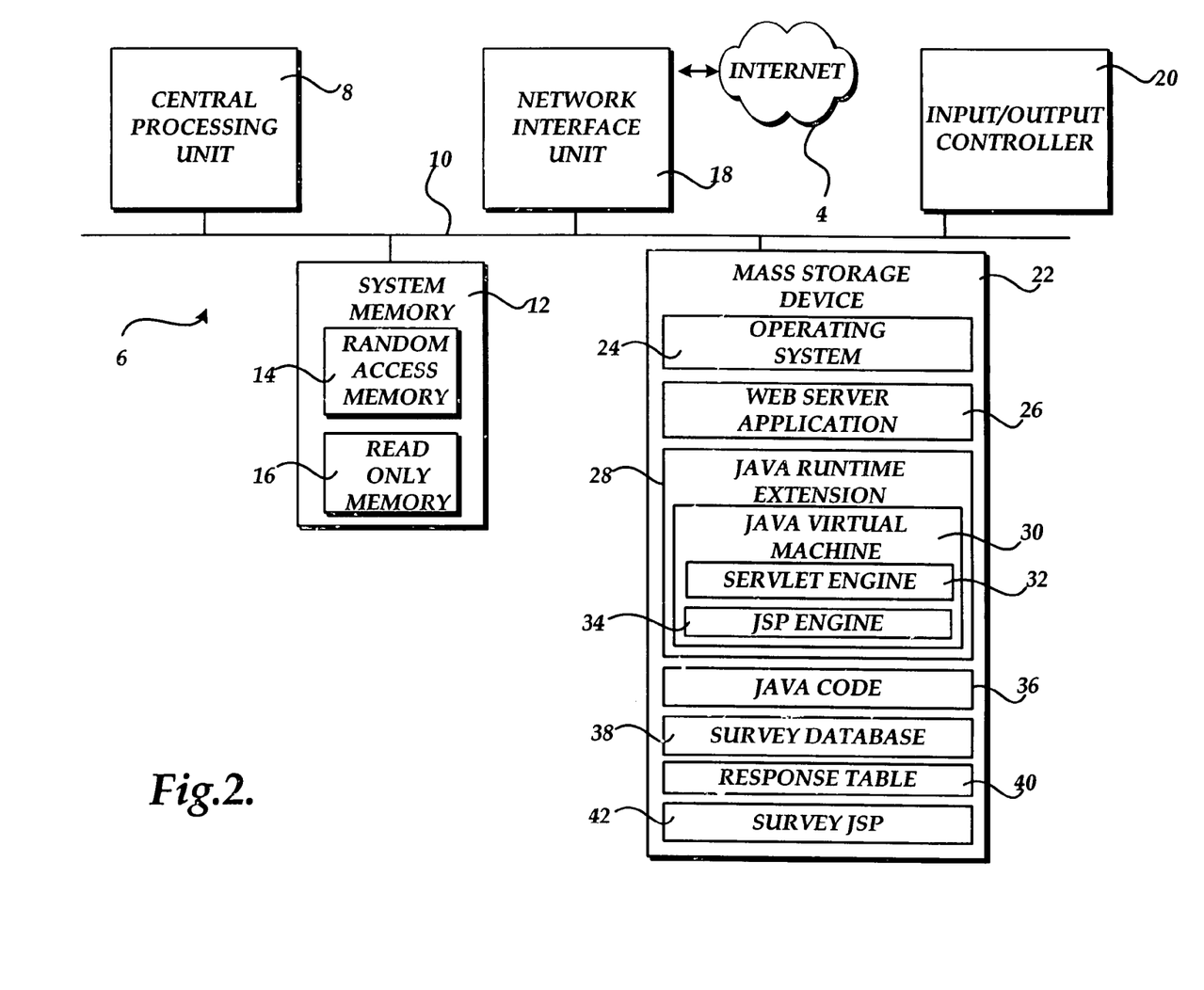
FIG. 2 is a block diagram showing an illustrative hardware architecture for a Web server computer utilized in an actual embodiment of the present invention.

Referring now to FIG. 2, a hardware architecture for an illustrative Web server computer 6 will be described. The Web server computer 6 comprises a general purpose server computer for receiving and responding to Hypertext Transfer Protocol ("HTTP") requests as known to those skilled in the art. The Web server computer 6 comprises a conventional server computer, including a central processing unit 8, a system memory 12, and a system bus 10 that couples the system memory 12 to the processing unit 8. The Web server computer 6 also typically includes at least some form of computer-readable media.

Computer-readable media can be any available media that can be accessed by the Web server computer 6. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory ("RAM"), read only memory ("ROM"), EPROM, EEPROM, flash memory or other solid-state memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by the Web server computer 6.

According to an embodiment of the present invention, the system memory 12 includes a ROM 16 and a RAM 14. A basic input/output system ("BIOS") (not shown), containing the basic routines that help to transfer information between elements within the Web server computer 6, such as during start-up, is stored in the ROM 16. The Web server computer 6 further includes a mass storage device 22, such as a hard disk drive, a magnetic disk drive, e.g., to read from or write to a removable disk, or an optical disk drive, e.g., for reading a CD-ROM disk or to read from or write to other optical media such as a DVD. The Web server computer 6 may include a combination of such mass storage devices. The mass storage device 22 is connected to the system bus 10 through a mass storage device interface (not shown).

As described above with respect to FIG. 1, the Web server computer 6 operates in a networked environment. According to an embodiment of the invention, the Web server computer 6 communicates with the client computer 2 over the Internet 4. The Web server computer 6 connects to the Internet 4 through a network interface unit 18. It should be appreciated that the network connections shown are illustrative and other means of establishing a communications link between the Web server computer 6 and the Internet 4 may be utilized.

A user may control the operation of the Web server computer 6 through traditional input devices such as a keyboard or a mouse. These and other input devices may be connected to the central processing unit 8 through an input/output controller 20 that is coupled to the system bus 10. A monitor (not shown) or other type of display device may also be connected to the system bus 10 via a video display interface (not shown). Additionally, the Web server computer 6 may include other peripheral output devices, such as a printer.

A number of program modules may be stored in the mass storage device 22 and RAM 14, including an operating system 24 suitable for controlling the operation of a server computer, such as the SOLARIS operating system from SUN MICROSYSTEMS of Palo Alto, Calif. Additionally, a Web server application program 26 may be stored in the mass storage device 22 and the RAM 30, such as the IPLANET WEB SERVER, provided by IPLANET E-COMMERCE SOLUTIONS—A SUN/NETSCAPE ALLIANCE, of Palo Alto, Calif. As known to those skilled in the art, the Web server application program 26 is operative to receive HTTP requests through the network interface 18 and to respond to those requests. Typically, an HTTP request will take the form of a request for a network resource such as a JAVA server page ("JSP") page, a page encoded in HTML, a graphics file, or another application program stored at, or accessible to, the Web server computer 6.

In conjunction with the Web server application 26, the Web server computer 6 may also maintain a JAVA runtime extension package 28 that supports the use of JAVA servlets and JSP pages on the Web server computer 6. The JAVA runtime extension package 28 comprises a JAVA virtual machine 30 which includes a servlet engine 32 and a JSP engine 34. As known to those skilled in the art, JAVA servlets are programs written in the JAVA programming language from SUN MICROSYSTEMS that execute on a server computer as opposed to a client computer. The JAVA virtual machine 30 interprets JAVA programs that have been compiled into byte-code and stored in a class file.

JSP pages provide a simplified way to create Web pages that display dynamically-generated content. JSP pages utilize extensible markup language ("XML") tags and scriptlets written in JAVA to encapsulate the logic that generates the content for the page. JSP passes any formatting tags directly back to the response page. In this way, JSP pages separate the page logic from its design and display. More specifically, JSP pages are created to include JSP technology-specific tags, declarations, and possibly scriptlets, in combination with other static (HTML or XML) tags. The JSP engine 34 interprets the tags and scriptlets contained in a JSP page and generates a class file which, when interpreted by the servlet engine 32, generates and returns the desired content. A JSP page may include calls to JAVA code 36, JAVABEANS components, the JAVA Database Connectivity ("JDBC") application programming interface, or other types of components. A JSP page may also include a file. A JSP page has the extension ".jsp," which signals to the Web server application 26 that the JSP engine 34 will process elements on the page.

The Web server computer 6 also maintains a survey JSP page 42 on the mass storage device 22. Using the above-described process for executing JSP, the survey JSP page 42 generates the content for an online survey. As will be described in greater detail below with respect to FIGS. 6–8, the survey JSP page 42 utilizes a survey database 38 to generate content for displaying the survey questions and input fields. The survey JSP page 42 also utilizes a response table 40 to save responses to the online survey. Additional details regarding the format and structure of the survey database 38 and the response table 40 are described below with reference to FIGS. 3 and 5, respectively.

Those skilled in the art should appreciate that although the present invention is described herein as being implemented using JSP pages, other technologies for dynamically generating content may be utilized to implement the present invention. For instance, Active Server Pages ("ASP") from MICROSOFT CORPORATION of Redmond, Wash., could be utilized to implement the present invention. Those skilled in the art should also appreciate that although the present invention is described in the context of a Web server application, an application server may also be utilized to provide the functionality described herein.

Figure 3:
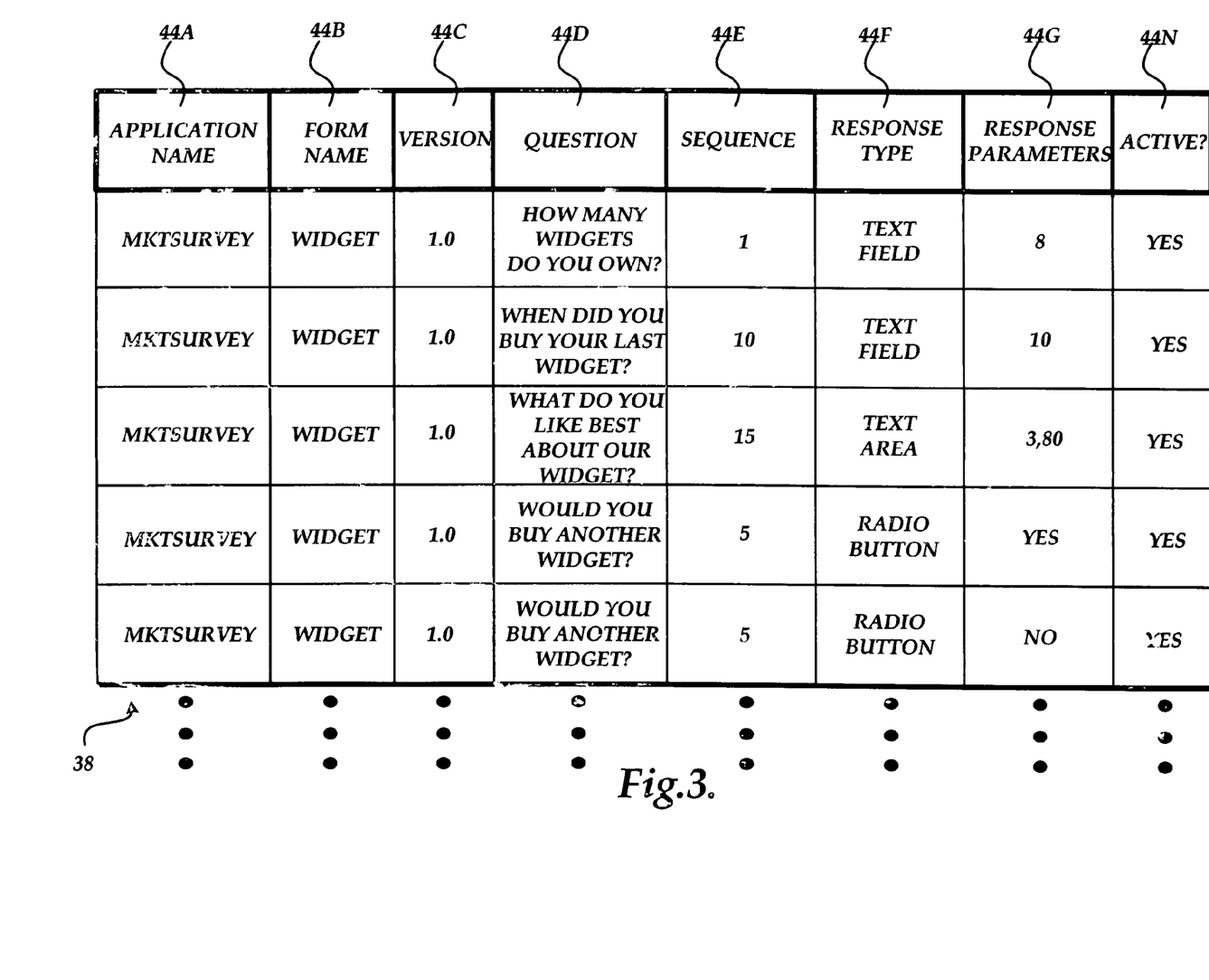
FIG. 3 is a block diagram showing the format and contents of an illustrative survey database utilized in an actual embodiment of the present invention.

Turning now to FIG. 3, the format and contents of the survey database 38 will be described. As discussed briefly above, the survey database 38 is utilized by the survey JSP page 42 to generate the content necessary for conducting an online survey. The survey database 38 defines the content of the online survey and describes how the content should be displayed. In particular, the survey database 38 contains a question field 44D that contains the questions that may be utilized in the online survey. For each question present in the question field 44D, an entry is also provided in a response type field 44F and a response parameters field 44G. The response type field 44E comprises data indicating what type of input field should be generated for each question. For instance, the response type field 44E may indicate that a text field for entering numbers, words, or other small pieces of text, a text area field for free-form, multi-line text entries, a radio button for picking one item in a list, or other type of input field should be displayed. The response parameters field 44G includes data indicating how the input field corresponding to each question should be displayed. For instance, an entry in the response parameters field 44G corresponding to a text field may indicate that a specified number of characters be provided in the text field. Similarly, an entry in the response parameters field 44G corresponding to a text area input field may indicate that a specified number or rows and columns be displayed for text entry. Likewise, an entry in the response parameters field 44G corresponding to a radio button may provide the response corresponding to the button, such as "yes" or "no." Other response fields and response parameters known to those skilled in the art may be utilized in addition to those described here and shown in FIG. 3.

The survey database 38 may also include an "active?" field 44n that indicates whether or not a particular question should be included in the survey. The survey database 38 may also include a sequence field 44e that indicates the ordering sequence for the questions. The survey database 38 may further include an application name field 44A identifying a software application associated with the questions, a form name field 44B identifying a particular Web form associated with the question, and a version field 44C identifying a version for the survey. Through the use of these fields, only questions associated with a particular application, form, or version may be selected for use with a particular online survey.

Figure 4:
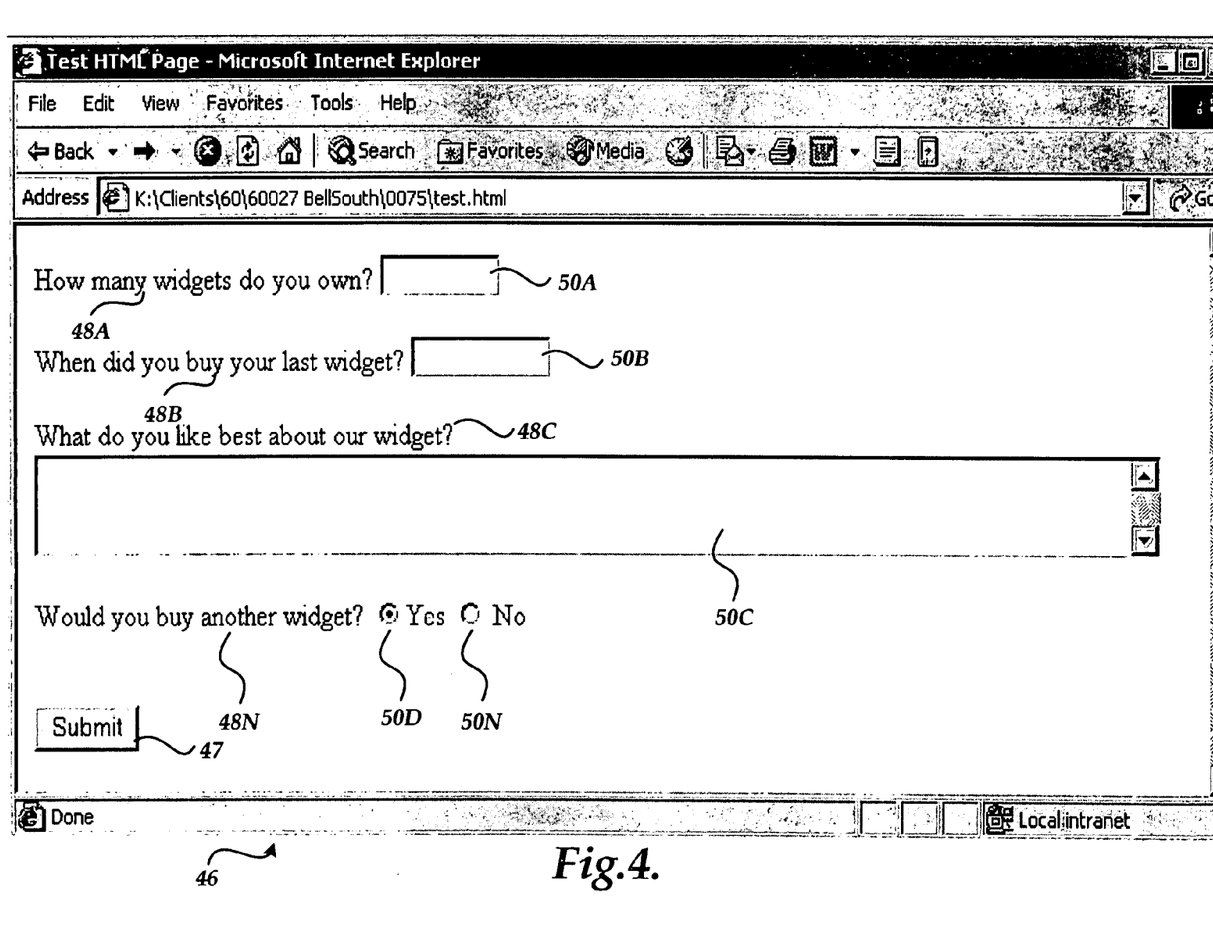
FIG. 4 is a screen diagram illustrating a web browser screen display including an illustrative web survey produced by an actual embodiment of the present invention.

Referring now to FIG. 4, an illustrative screen display showing a Web page generated by a software component provided in actual embodiment of the present invention will be described. FIG. 4 shows a Web browser window 46 displaying a Web page generated by the present invention based upon the illustrative contents of the survey database 38 shown in FIG. 3. In particular, the Web browser window 46 includes questions 48A–48N corresponding to the questions stored in the question field 44D. Likewise, the Web browser window 46 has response fields 50A–50N generated based upon the contents of the response type field 44F and the response parameters field 44G for each question. For instance, the response field 50A is eight characters wide, the response field 50B is ten characters wide, and the response field 50 is 80 characters wide and three rows high. Additionally, the questions 48A–48N are presented in the order specified by the sequence field 44E and only those questions identified as displayable in the "active?" field 44N are displayed. An illustrative routine for generating the content necessary to create the contents of the Web browser window 46 will be described below with reference to FIGS. 6 and 7.

Figure 5:
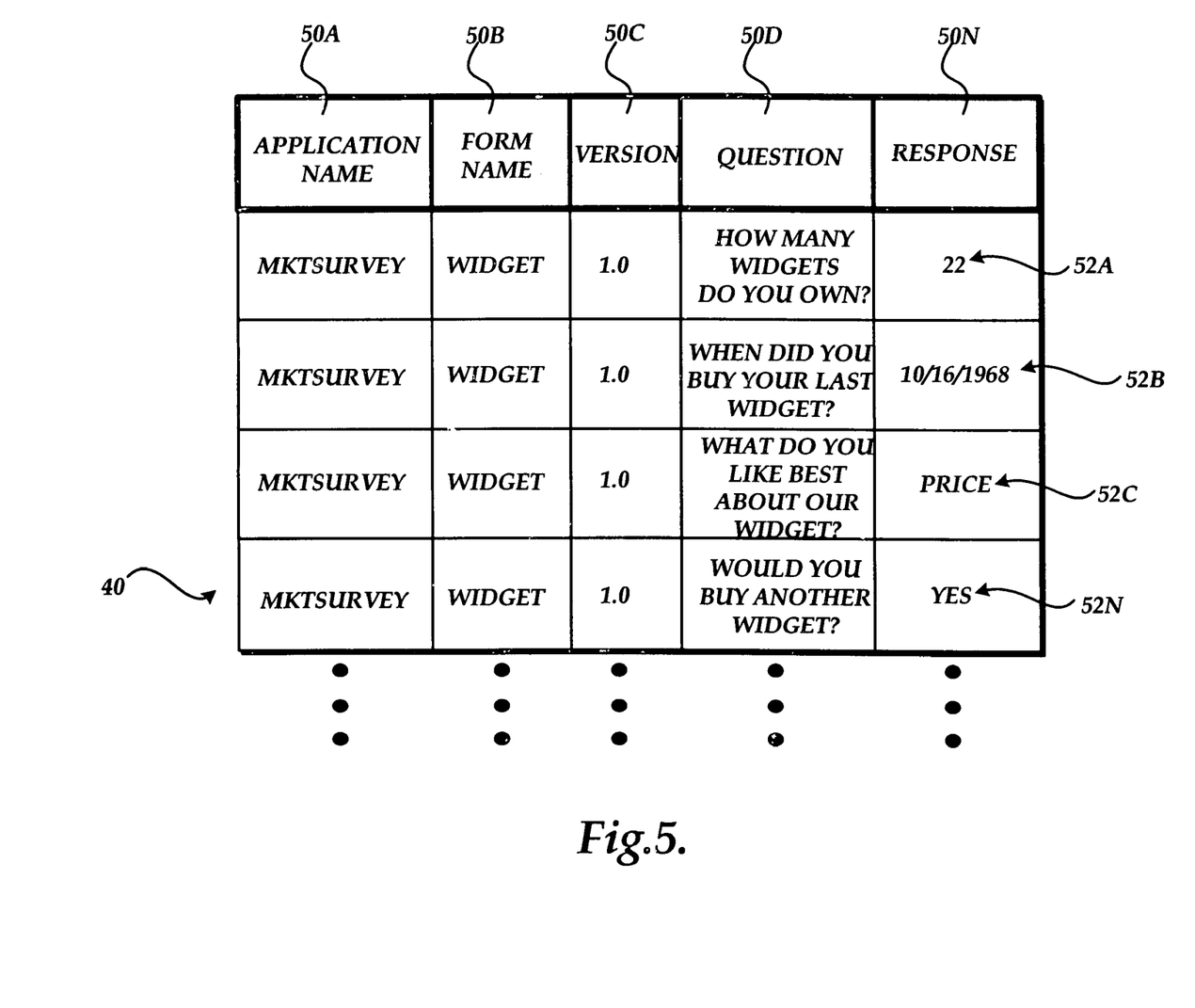
FIG. 5 is a block diagram showing the format and contents of an illustrative response table utilized in an actual embodiment of the present invention.

Referring now to FIG. 5, an illustrative response table 40 will be described. As mentioned briefly above, the response table 40 is utilized to store the responses provided as answers to the survey questions. The response table 40 includes an application name field 50A that identifies the survey application with which the questions are associated. Similarly, the response table 40 includes a form name 50B that identifies a particular Web form associated with the survey and a version field 50C that identifies the version number of the survey. The survey table 40 also includes a question field 50D that stores a question and a response field 50N that stores the response 52 associated with the question. In this manner, the responses provided by one or more users to a survey may be stored in a single table, or database, and sorted or analyzed together.

Figure 6:
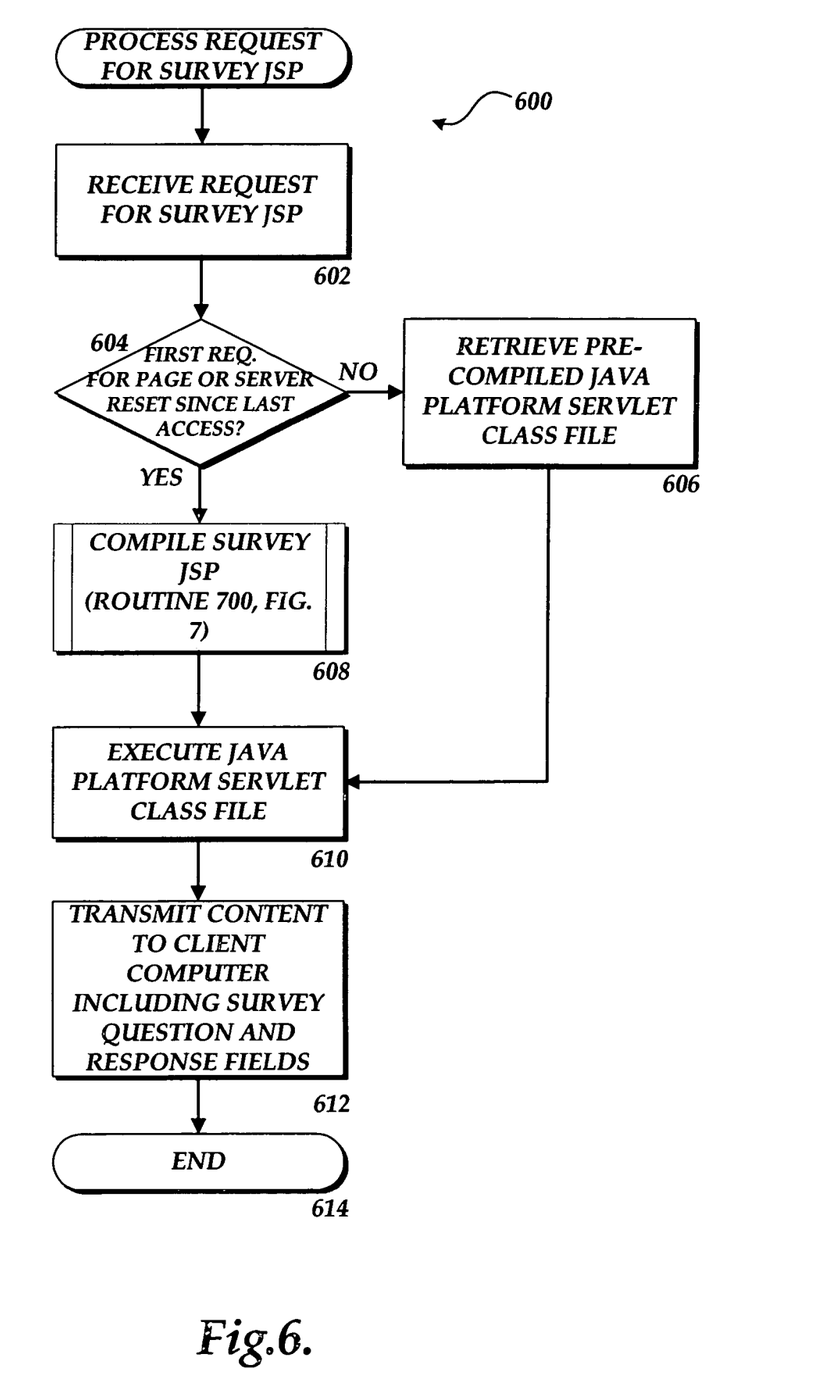
FIG. 6 is a flow diagram showing an illustrative routine for processing a request for a network resource that includes an electronic survey according to an actual embodiment of the present invention.

Referring now to FIG. 6, an illustrative Routine 600 will be described for processing a request for a network resource that includes an electronic survey. As described briefly above, the survey JSP page 42 contains program code necessary to generate the content for displaying the online survey from the contents of the survey database 38. The Routine 600 begins a block 600 where a request for the survey JSP page 42 is received at the Web server computer 6 from a Web browser application executing on a client computer 2. The Routine 600 then continues from block 602 to block 604, where a determination is made as to whether a previously compiled class file should be utilized to respond to the request for the survey JSP page 42. As mentioned above, a JSP page is compiled into an executable class file by the JSP engine 34. The class file may then be interpreted by the JAVA virtual machine 30 and its output returned in response to the request for the JSP page.

A previously compiled class file would therefore not be available if the request for the survey JSP page 42 is the first such request. Additionally, a previously compiled class file will not be utilized if the Web server application 26 has been reset since the previous request for the survey JSP page 42. Accordingly, if the request for the survey JSP page 42 is the first such request or if the Web server application 26 has been reset since the last access of the survey JSP page 42, the Routine 600 continues to block 608. If these conditions are not met, the Routine 600 branches to block 606, where the previously compiled class file associated with the survey JSP page 42 is retrieved. The Routine 600 then continues from block 606 to block 610.

Figure 7:
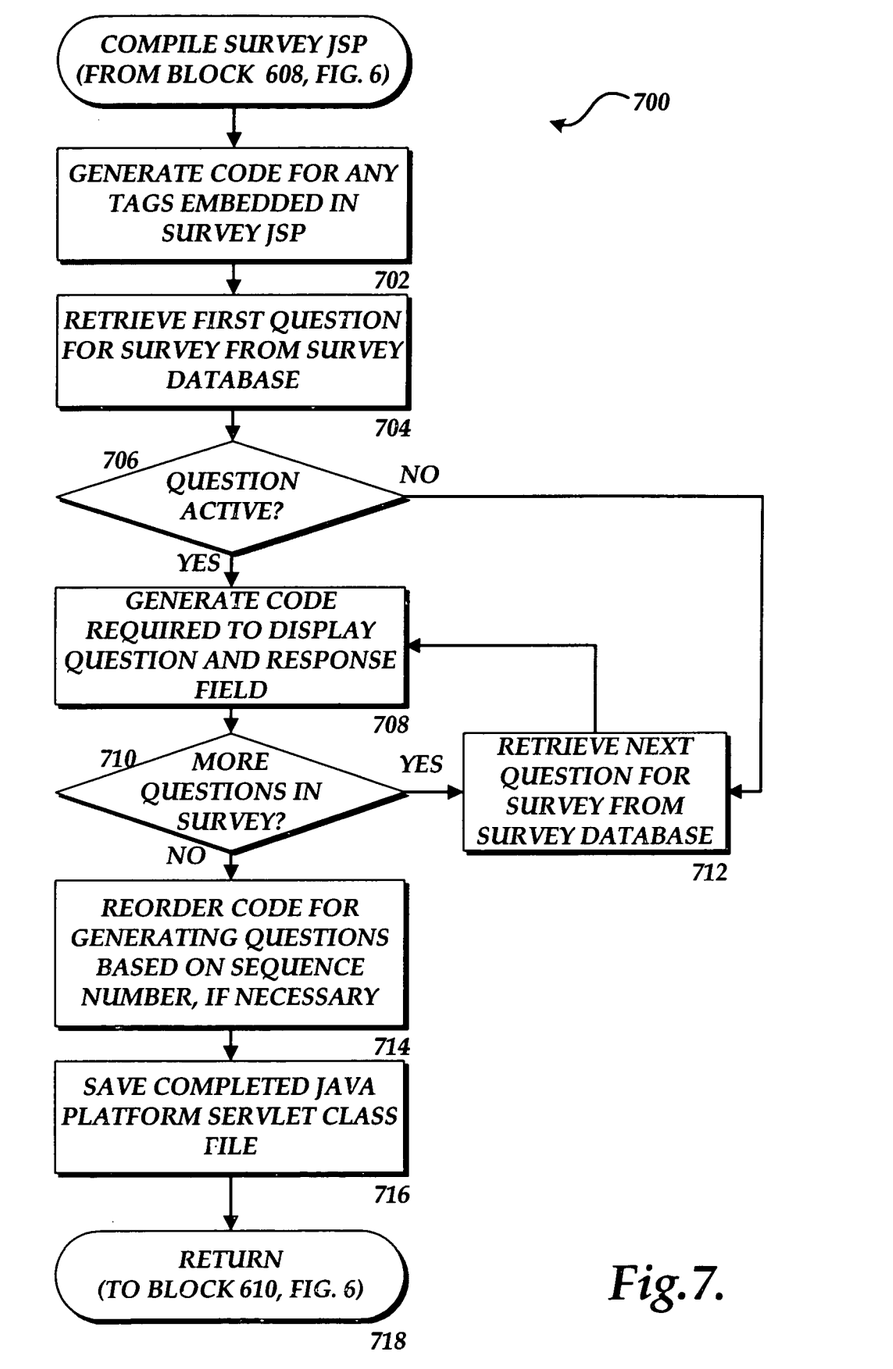
FIG. 7 is a flow diagram showing an illustrative routine for compiling a network resource that includes an electronic survey according to an actual embodiment of the present invention.

At block 608, the survey JSP page 42 is compiled into a class file that may be interpreted by the JAVA virtual machine 30 to respond to the request for the survey JSP page 42. An illustrative Routine 700 is described below for compiling the survey JSP page 42 into byte-code compatible with the JAVA virtual machine 30. From blocks 608 and block 606, the Routine 600 continues to block 610 where either the previously compiled class file or the recently compiled class file are executed by the JAVA virtual machine 30. Markup language content capable of being displayed in a Web browser is generated when the class file is executed. This content generates the questions and input fields as specified in the survey database 38.

At block 612, the content generated by the execution of the class file, including the survey questions and response fields, is transmitted in response to the request for the survey JSP page 42. This content may then be displayed in a Web browser. The response fields may be completed by a user and the response data transmitted back to the Web server application 26. An illustrative Routine 800 for receiving and processing the response data is described below with reference to FIG. 8. The Routine 600 continues from block 612 to block 614, where it ends.

Turning now to FIG. 7, an illustrative Routine 700 will be described for compiling the survey JSP page 42 into byte-code compatible with the JAVA virtual machine 30. The Routine 700 begins at block 702, where code is generated for any static markup language found within the survey JSP page 42. Generally, this process involves simply passing the static HTML or XML directly through to the compiled code. From block 700 the Routine 700 transitions to block 704, where the first question for the identified survey is retrieved from the survey database 38. The Routine 700 then continues to block 706, where a determination is made as to whether the question is active and should be included in the survey. The "active?" field 44N for the current question is consulted to make this determination. If the current question should not be included in the survey, the Routine 700 branches to block 712.

If, at block 706, it is determined that the current question should be included in the survey, the Routine 700 continues to block 708. At block 708, code is generated for displaying the question and the associated response field. In order to generate this code, the question field 44D, response type field 44F, and response parameter field 44G associated with the question may be utilized. Once the code has been generated for the current question and response field, the Routine 700 continues to block 710, where a determination is made as to whether more questions are contained in the survey database 38 for the identified survey. If additional questions remain, the Routine 700 branches to block 712, where the next question is retrieved, and to block 710 where code for the question is generated. If no additional questions remain, the Routine 700 continues to block 714.

At block 714, code for generating the questions and response fields may be reordered so that the questions and response fields are generated in a sequence as specified by the sequence field 44E of the survey database 38. The Routine 700 then continues to block 716, where the completed JAVA class file is saved. When executed by the JAVA virtual machine 30, the class file will generate the markup language code necessary to display the questions and response fields in a Web browser. From block 716, the Routine 700 continues to block 718, where it returns to block 610, described above with respect to FIG. 6. The processing illustrated at blocks 704, 706, 708, 710, and 712 may be performed by making a call to an external database.

Figure 8:
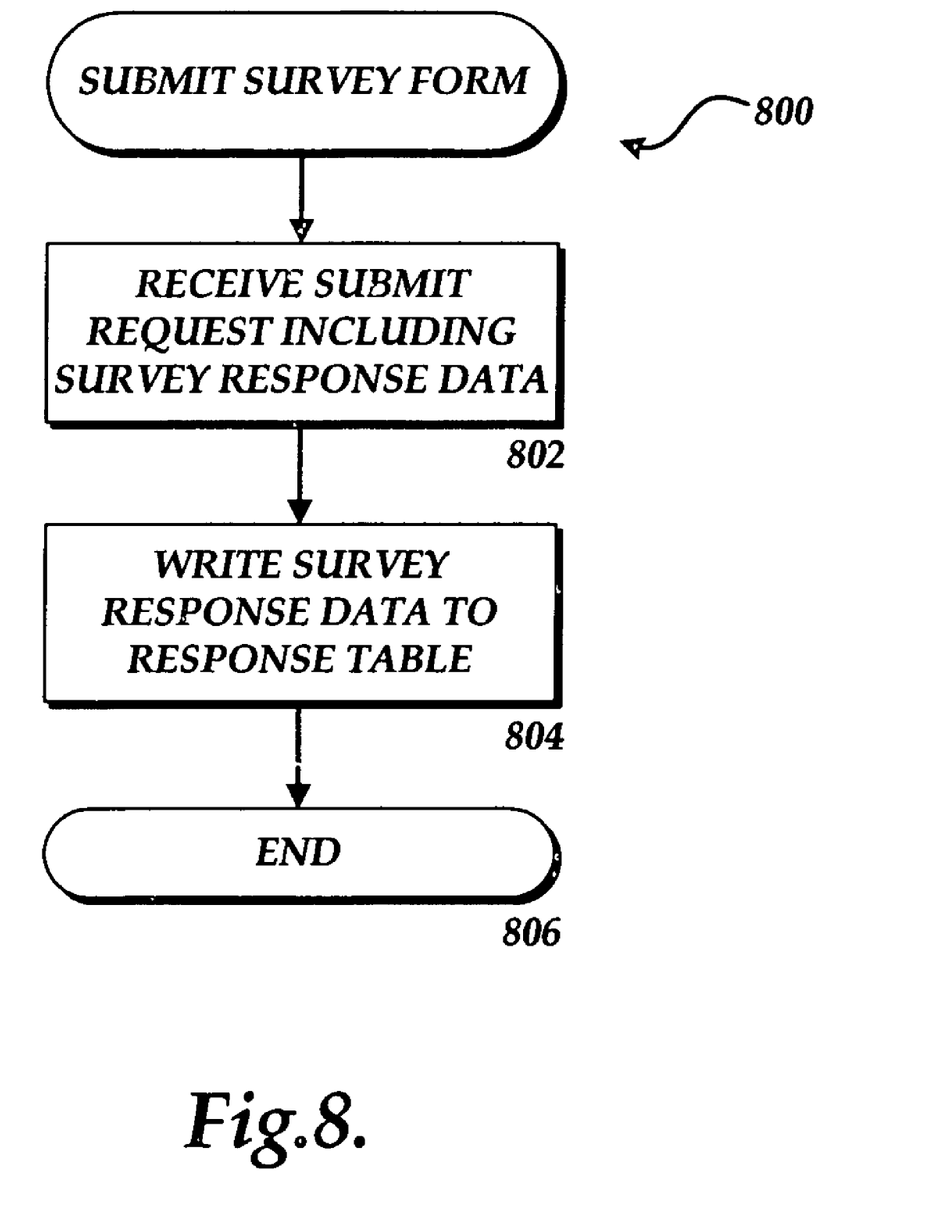
FIG. 8 is a flow diagram showing an illustrative routine for processing a request to submit the results of a completed survey form according to an actual embodiment of the present invention.

Referring now to FIG. 8, an illustrative Routine 800 will be described for processing a request to submit the results of a completed survey form according to one actual embodiment of the present invention. When a user has completed the survey by providing answers to each of the survey questions in the response fields, the user may select a "submit" button to submit the results of the survey to the Web server application 26. The Routine 800 begins at block 802, where such a request to submit the response data is received. The submit request will include data identifying the questions, the response data corresponding to each question and response field, and the application name, form name, and version number for the survey. Once this information has been received, the Routine 800 will continue to block 804, where the survey response data will be stored in the response table 40. The Routine 800 then continues to block 806, where it ends.

Based upon the foregoing, it should be appreciated that the present invention provides a method, computer system, and computer-readable medium for conducting an online survey. Moreover, the above specification, examples and data provide a complete description of the manufacture and use of the composition of the invention. Since many embodiments of the invention can be made without departing from the spirit and scope of the invention, the invention resides in the claims hereinafter appended.

We claim:

1. A method for conducting an online survey having one or more questions, the method comprising:

maintaining a survey database, the database comprising the one or more questions and data identifying a type of input field for each question wherein the survey database comprises, data display data for each of the one or more questions indicating how input fields for each of the one or more questions should be displayed, the data display data comprising a question field for each of the one or more questions comprising its respective question, a response type field for each of the one or more questions indicating what type of input field should be generated for its respective question, and a response parameter field for each of the one or more questions indicating how the input field corresponding to each respective question should be displayed, data comprising sequence numbers wherein each of the one or more questions has a sequence number indicating a sequence for the one or more questions, data comprising activation indicators wherein each of the one or more questions has an activation indicator indicating whether each of the one or more questions should be included in the electronic survey and wherein the class file does not generate markup language for each of the one or more questions not to be included in the survey when executed, and an application name corresponding to the electronic survey, the application name identifies a software application associated with the one or more questions, a form name, and a version number;

receiving a request for a network resource including the electronic survey, wherein the request is received at a web server computer maintaining the network resource from a web browser;

in response to the request, determining whether a previously compiled class file should be utilized to respond to the request, the previously compiled class file is separate from the survey database such that altering the online survey only requires altering the survey database and not the Previously compiled class file;

in response to determining that a previously compiled class file should not be utilized to respond to the request, creating an executable class file capable of generating markup language for displaying the questions and the input fields in a web browser, the executable class file is separate from the survey database such that altering the online survey only requires altering the survey database and the executable class file can be reused without modification, wherein creating the executable class file comprises, determining which questions within the one or more questions are active based upon the activation indicators, generating, based at least on the data display data, code for the executable class file required to display the active questions and response fields corresponding to the active questions, and reordering the code for generating active questions based on the sequence numbers associated with the active questions;

generating the markup language by executing the class file;

maintaining a response table, the response table comprising the form name, the form name identifies a version number of the survey, a survey table, the survey table includes a question field that stores the one or more questions and a response field that stores the response associated with the one or more questions;

returning the markup language as a response to the request for a network resource.

2. The method of claim 1, wherein determining whether a previously compiled class file should be utilized comprises determining whether the request for the network resource was a first request for the network resource.

3. The method of claim 1, wherein determining whether a previously compiled class file should be utilized comprises determining whether the request for the network resource was a first request for the network resource or whether a web server operative to provide the network resource was reset since the last time the network resource was accessed.

4. The method of claim 1, wherein the web server computer is operative to receive response data corresponding to the input fields and to store the response data in a database.

5. A system for conducting an online survey having one or more questions, the system comprising:
- a memory storage for maintaining a database; and
- a processing unit coupled to the memory storage, wherein the processing unit is operative to:
  - maintain a survey database, the database comprising the one or more questions and data identifying a type of input field for each question wherein the survey database comprises,
    - data display data for each of the one or more questions indicating how input fields for each of the one or more questions should be displayed, the data display data comprising a question field for each of the one or more questions comprising its respective question, a response type field for each of the one or more questions indicating what type of input field should be generated for its respective question, and a response parameter field for each of the one or more questions indicating how the input field corresponding to each respective question should be displayed,
    - data comprising sequence numbers wherein each of the one or more questions has a sequence number indicating a sequence for the one or more questions,
    - data comprising activation indicators wherein each of the one or more questions has an activation indicator indicating whether each of the one or more questions should be included in the electronic survey and wherein the class file does not generate markup language for each of the one or more questions not to be included in the survey when executed, and
    - an application name corresponding to the electronic survey, the application name identifies a software application associated with the one or more questions, a form name, and a version number;
  - maintain a response table, the response table comprising the form name, the form name identifies a version number of the survey, a survey table, the survey table includes a question field that stores the one or more questions and a response field that stores the response associated with the one or more questions;
  - receive a request for a network resource including the electronic survey, wherein the request is received at a web server computer maintaining the network resource from a web browser;
  - in response to the request, determine whether a previously compiled class file should be utilized to respond to the request, the previously compiled class file is separate from the survey database such that altering the online survey only requires altering the survey database and not the previously compiled class file;
  - in response to determining that a previously compiled class file should not be utilized to respond to the request, create an executable class file capable of generating markup language for displaying the questions and the input fields in a web browser, the executable class file is separate from the survey database such that altering the online survey only requires altering the survey database and the executable class file can be reused without modification, wherein the processing unit being operative to create the executable class file further comprises the processing unit being operative to,
    - determine which questions within the one or more questions are active based upon the activation indicators,
    - generate, based at least on the data display data, code for the executable class file required to display the active questions and response fields corresponding to the active questions, and
    - reorder the code for generating active questions based on the sequence numbers associated with the active questions;
  - generate the markup language by executing the class file; and
  - return the markup language as a response to the request for a network resource.

6. The system of claim 5, wherein the processing unit operative to determine whether a previously compiled class file should be utilized comprises the processing unit operative to determine whether the request for the network resource was a first request for the network resource.

7. The system of claim 5, wherein the processing unit operative to determine whether a previously compiled class file should be utilized comprises the processing unit operative to determine whether the request for the network resource was a first request for the network resource or whether a web server operative to provide the network resource was reset since the last time the network resource was accessed.

8. The system of claim 5, wherein the web server computer is operative to receive response data corresponding to the input fields and to store the response data in a database.

9. A computer-readable medium which stores a set of instructions which when executed performs a method for conducting an online survey having one or more questions, the method executed by the set of instructions comprising:
- maintaining a survey database, the database comprising the one or more questions and data identifying a type of input field for each question wherein the survey database comprises,
  - data display data for each of the one or more questions indicating how input fields for each of the one or more questions should be displayed, the data display data comprising a question field for each of the one or more questions comprising its respective question, a response type field for each of the one or more questions indicating what type of input field should be generated for its respective question, and a response parameter field for each of the one or more questions indicating how the input field corresponding to each respective question should be displayed,
  - data comprising sequence numbers wherein each of the one or more questions has a sequence number indicating a sequence for the one or more questions,
  - data comprising activation indicators wherein each of the one or more questions has an activation indicator indicating whether each of the one or more questions should be included in the electronic survey and wherein the class file does not generate markup language for each of the one or more questions not to be included in the survey when executed, and
  - an application name corresponding to the electronic survey, the application name identifies a software application associated with the one or more questions, a form name, and a version number;
- receiving a request for a network resource including the electronic survey, wherein the request is received at a web server computer maintaining the network resource from a web browser;

in response to the request, determining whether a previously compiled class file should be utilized to respond to the request, the previously compiled class file is separate from the survey database such that altering the online survey only requires altering the survey database and not the previously compiled class file;

in response to determining that a previously compiled class file should not be utilized to respond to the request, creating an executable class file capable of generating markup language for displaying the questions and the input fields in a web browser, the executable class file is separate from the survey database such that altering the online survey only requires altering the survey database and the executable class file can be reused without modification, wherein creating the executable class file comprises,     determining which questions within the one or more questions are active based upon the activation indicators,     generating, based at least on the data display data, code for the executable class file required to display the active questions and response fields corresponding to the active questions, and     reordering the code for generating active questions based on the sequence numbers associated with the active questions;

generating the markup language by executing the class file;

maintaining a response table, the response table comprising the form name, the form name identifies a version number of the survey, a survey table, the survey table includes a question field that stores the one or more questions and a response field that stores the response associated with the one or more questions;

returning the markup language as a response to the request for a network resource.

10. The computer-readable medium of claim 9, wherein determining whether a previously compiled class file should be utilized comprises determining whether the request for the network resource was a first request for the network resource.

11. The computer-readable medium of claim 9, wherein determining whether a previously compiled class file should be utilized comprises determining whether the request for the network resource was a first request for the network resource or whether a web server operative to provide the network resource was reset since the last time the network resource was accessed.

12. The computer-readable medium of claim 9, wherein the web server computer is operative to receive response data corresponding to the input fields and to store the response data in a database.

* * * * *